United States Patent
Galloway

(10) Patent No.: US 12,522,774 B2
(45) Date of Patent: Jan. 13, 2026

(54) PROCESS AND SYSTEM FOR DUPLEX ROTARY REFORMER

(71) Applicant: Raven SR, Inc., Pinedale, WY (US)

(72) Inventor: Terry R. Galloway, Berkeley, CA (US)

(73) Assignee: Raven SR, Inc., Pinedale, WY (US)

( * ) Notice: Subject to any disclaimer, the term of this patent is extended or adjusted under 35 U.S.C. 154(b) by 392 days.

(21) Appl. No.: 17/667,263

(22) Filed: Feb. 8, 2022

(65) Prior Publication Data

US 2022/0162509 A1 May 26, 2022

Related U.S. Application Data

(63) Continuation of application No. 14/847,798, filed on Sep. 8, 2015, now Pat. No. 11,268,038.

(60) Provisional application No. 62/046,342, filed on Sep. 5, 2014.

(51) Int. Cl.
| | |
|---|---|
| *C10J 3/00* | (2006.01) |
| *C10G 2/00* | (2006.01) |
| *C10K 1/02* | (2006.01) |
| *C10K 1/20* | (2006.01) |
| *H01M 8/0612* | (2016.01) |

(52) U.S. Cl.
CPC ............... *C10J 3/005* (2013.01); *C10G 2/30* (2013.01); *C10J 3/007* (2013.01); *C10K 1/022* (2013.01); *C10K 1/20* (2013.01); *H01M 8/0643* (2013.01); *C10J 2200/09* (2013.01); *C10J 2200/158* (2013.01); *C10J 2300/0916* (2013.01); *C10J 2300/0946* (2013.01); *C10J 2300/0969* (2013.01); *C10J 2300/0976* (2013.01); *C10J 2300/0989* (2013.01); *C10J 2300/1253* (2013.01); *C10J 2300/1276* (2013.01); *C10J 2300/1646* (2013.01); *C10J 2300/1659* (2013.01); *C10J 2300/1815* (2013.01); *C10J 2300/1853* (2013.01); *C10J 2300/1861* (2013.01); *Y02E 50/30* (2013.01); *Y02P 20/129* (2015.11); *Y02P 20/145* (2015.11); *Y02P 30/00* (2015.11)

(58) Field of Classification Search
CPC .. C01B 2203/00; F27B 200/3217; F27B 7/00; F27B 7/224; F27B 7/34; F27B 27/36; F27B 9/3005; F27B 2009/3038; F27D 3/00
USPC ............... 219/200, 388, 389, 393, 401, 385; 373/111, 115, 116, 123; 110/246, 250, 110/254, 255, 257, 258, 259, 304, 306, 110/309, 346, 106, 115
See application file for complete search history.

(56) References Cited

U.S. PATENT DOCUMENTS

2012/0277329 A1\* 11/2012 Galloway ............... C10J 3/84
422/162

\* cited by examiner

*Primary Examiner* — Phuong T Nguyen
(74) *Attorney, Agent, or Firm* — Dentons Bingham Greenebaum LLP; Brian W. Chellgren

(57) ABSTRACT

Methods and apparatuses for producing fuel and power from the reformation of organic waste include the use of steam to produce syngas in a Fischer-Tropsch reaction, followed by conversion of that syngas product to hydrogen. Some embodiments include the use of a heated auger both to heat the organic waste and further cool the syngas.

21 Claims, 13 Drawing Sheets

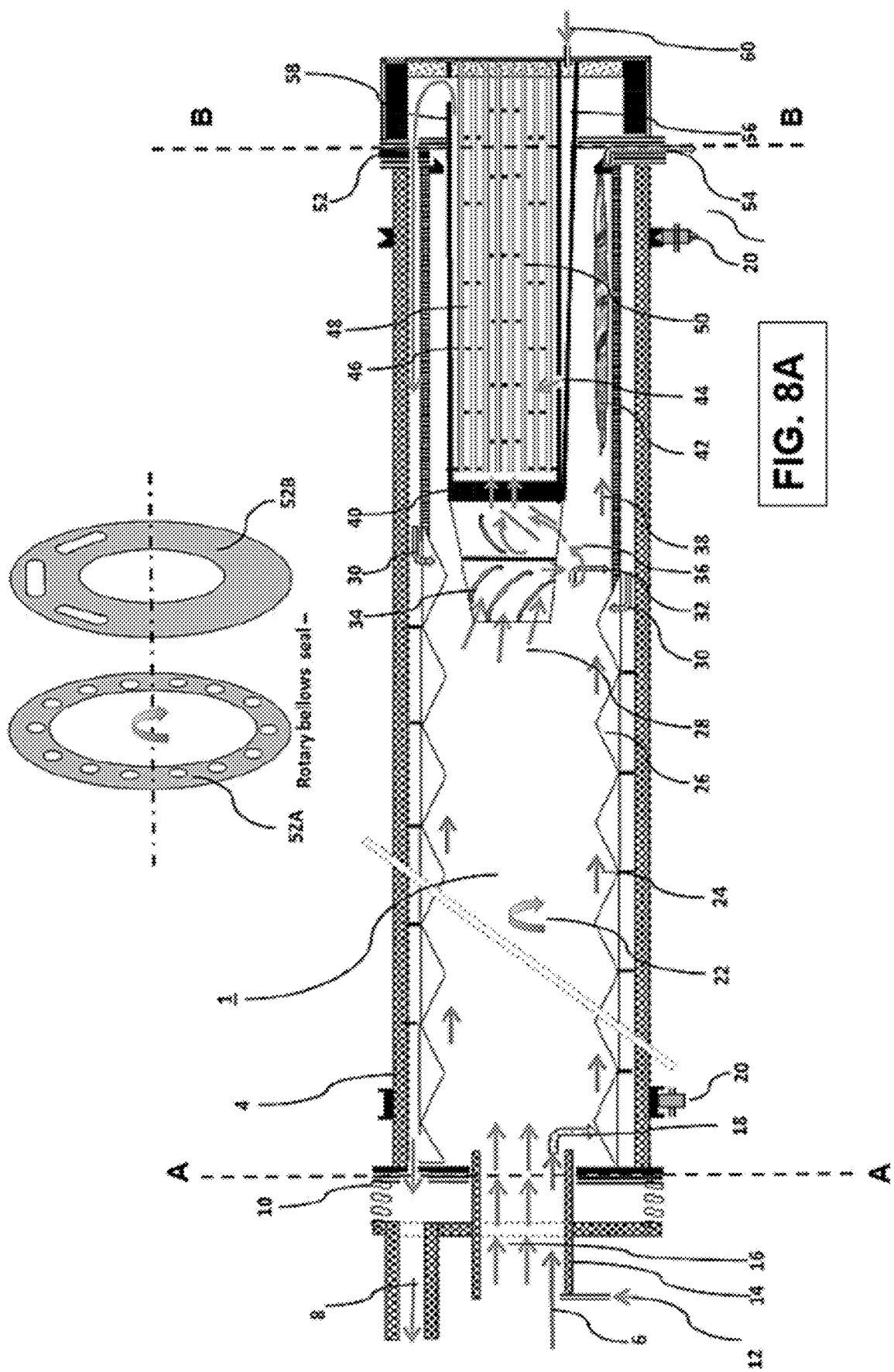

PROCESS AND SYSTEM FOR DUPLEX ROTARY REFORMER

CROSS REFERENCE TO RELATED APPLICATION

This application is a continuation of U.S. patent application Ser. No. 14/847,798, filed Sep. 8, 2015, which claims the benefit of priority to U.S. Provisional Patent Application Ser. No 62/046,342, filed Sep. 5, 2014, both of which are incorporated herein by reference.

FIELD OF THE INVENTION

Various embodiments of the present invention pertain to the conversion of waste materials into other forms of energy, and in some embodiments to the conversion of waste materials into both combustible gas and electricity, and further such inventions with significant sequestration of carbon dioxide.

BACKGROUND OF THE INVENTION

There is a great need to destroy a wide range of solid organic waste streams generated around the world and at the same time to convert this carbonaceous waste into useful hydrogen-rich syngas by a compact, inexpensive rotary reformer to: (1) drive a fuel cell and (2) feed a Fischer-Tropsch unit—both to produce clean energy.

The challenge and problem with fuel cells has been their sensitivity to various unknown chemical poisons at parts per million levels coming from the waste streams from harming the electrochemical catalysts of the high temperature fuel cells. By comparison Flory-Huggins catalysts in Fischer-Tropsch reactors (such as supported iron and cobalt-based catalysts) are less sensitive to poisons than fuel cells and are highly exothermic.

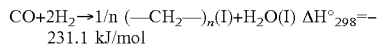
$CO+2H_2 \rightarrow 1/n \ (-CH_2-)_n(I)+H_2O(I) \ \Delta H°_{298}=-231.1 \ kJ/mol$ Conversion of syngas to methanol using copper catalysts in the gas phase or liquid-phase catalysts are exothermic and also less sensitive to poisons.

$CO+2H_2 \rightarrow CH_3OH(I) \ \Delta H°_{298}=-128.2 \ kJ/mol$

There is syngas methanation that is exothermic:

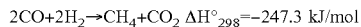
$2CO+2H_2 \rightarrow CH_4+CO_2 \ \Delta H°_{298}=-247.3 \ kJ/mol$

And there are many other exothermic reactions that can use syngas and preferably produce useful high-carbon content chemicals of commercial use.

These highly exothermic reactors produce high-grade useful energy. Some of them can convert syngas with enough exothermicity to make electricity, steam and heat. These exothermic reactors can substitute for fuel cells.

What is needed are processes and systems for converting waste into fuel and energy with increased efficiency. Various embodiments of the present invention provide such processes and systems that are novel and non-obvious.

SUMMARY OF THE INVENTION

One embodiment relates to an improved rotary steam/$CO_2$ reformer that uses an electrically heated gas-phase steam/$CO_2$ reformer insert as well as hollow spiral flights around the rotary retort tube in which a solid organic waste stream is converted to syngas that can be used for fuel cell or other non-combustive heat engines for electric power generation and the production of renewable hydrocarbon fuels.

Another embodiment also makes use of fuel cells for providing the process parasitic load and heat. Yet another embodiment uses exothermic chemical reactors using syngas to produce heat, such as by Fischer-Tropsch. It can also relate to control or elimination of the emissions of greenhouse gases in the power recovery process with the goal of producing energy in the future carbonless and energy intense world economy.

One aspect of this process train is an improved duplex non-combustive kiln that combines the functions of the conventional kiln, steam/$CO_2$ reformer, and the high temperature filter into a single unit, with one exemplary process shown in illustration as FIG. 1. The downstream desulfurizer/getter bed process units can thus operate at a lower temperature.

This duplex rotary reformer according to another embodiment further accepts the hot, light end gases from either or both the PSA units for making hydrogen fuel as well as the light end gases that formerly were waste products from the Fischer-Tropsch process and use this light end gases to provide additional heat to the duplex rotary reformer to make more syngas to make more product.

Still further embodiments involve using duplex kiln helical spiral flights moving counter-current to the hot exit syngas in a process train that also serves as the heat exchanger. Some embodiments are disclosed that will quench-cool the syngas down from 800 to 1100° C. (1500 to 2000° F.) to the temperature range of the desulfurizer to 370° C. (700° F.). One aspect of still further embodiments is to quench the syngas so that the undesirable PAHs, soot or heavy hydrocarbon recombination reactions (i.e. "De-Novo") that make dioxins and furans do not have time to form, since they are kinetically limited. These recombination reactions may involve multi-step polymerization and/or ring formation and are slowed as the temperatures are lowered.

Further inventive options include a non-combustive Brayton cycle turbine to recover energy from the high temperature gas, while cooling it for feeding to both the Fischer-Tropsch unit to produce the high-carbon content product for sequestering the carbon and the shift converter and pressure-swing absorber to produce hydrogen fuel.

The Fischer-Tropsch reactor, as discussed in detail herein, is exothermic and may produce quantities of steam for operating a conventional steam turbo-generator system for powering the plant.

Yet other embodiments of the present invention include various components and process path arrangements for calcination of organic material substantially as shown in FIG. 2. Persons of ordinary skill in the art can reasonably and logically infer that not all of the components shown in this figure are necessary parts of any embodiment.

Yet other embodiments of the present invention include various components and process path arrangements for calcination of organic material substantially as shown in FIG. 4. Persons of ordinary skill in the art can reasonably and logically infer that not all of the components shown in this figure are necessary parts of any embodiment.

Yet other embodiments of the present invention include various components and process path arrangements for calcination of organic material substantially as shown in FIGS. 6A, 6B and 6C. Persons of ordinary skill in the art can reasonably and logically infer that not all of the components shown in these figures are necessary parts of any embodiment.

Some embodiments of the present invention include the conversion of a waste stream by steam/$CO_2$ reforming to produce a syngas that is used in a Fischer-Tropsch reactor to produce energy, minimize GHG emissions and sequester the carbon of the waste at the same time.

Although various apparatus and methods will be described in detail, other embodiments of the present invention are not so limited, and can include, as examples, alternatives to: modify or change the helical flight shape or arrangement; the method of removing the fine particulate from the syngas before it enters the electrically-heated steam/$CO_2$ reformer; the porous filter plate; and heat transfer enhancements using the electrical heating elements. Also interchanging the syngas cleaning process units around while keeping the same functionality are covered under various embodiments. All such generalizations are covered by this invention.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Further features and advantages will become apparent from the following and more particular description of the preferred embodiment of the invention, as illustrated in the accompanying drawings in which:

In FIGS. 8A, 8B, and 8C, there are shown an improved duplex kiln that includes one or more of the functions of the conventional kiln, steam/$CO_2$ reformer, swirling fines to drop out, the high temperature filter, recovery of high temperature radial heat loss, and internal heating of helical spiral flights at the wall into a single unit.

FIG. 8A is a cross sectional view of a rotary reformer of FIG. 1A according to one embodiment of the present invention.

FIG. 8B is a portion of the cross sectional view of FIG. 8A.

FIG. 8C is a portion of the cross sectional view of FIG. 8A.

Element Nomenclature

Figure 1A:
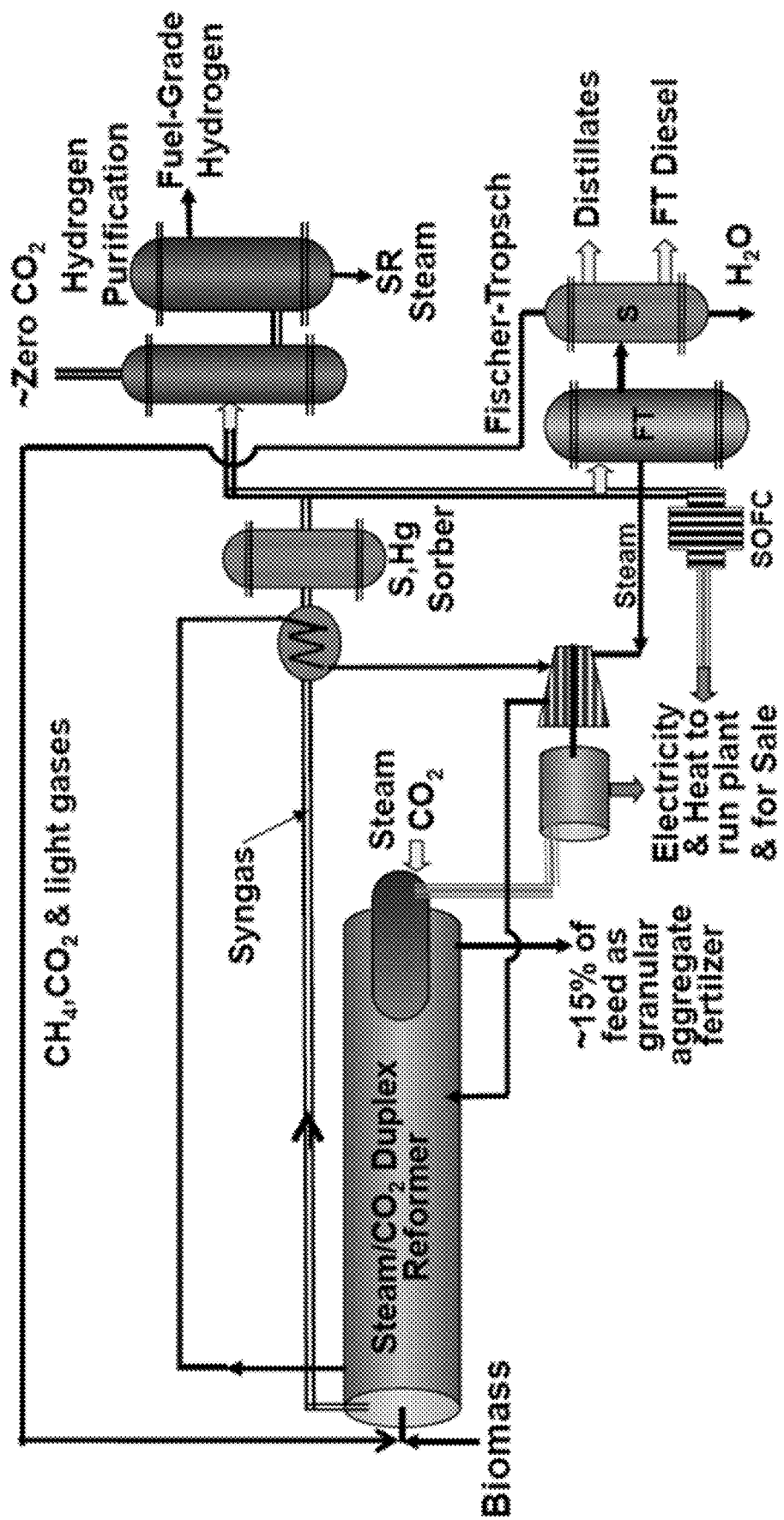
In FIG. 1A shows a schematic concept of a duplex kiln according to one embodiment of the present invention that can be followed by quench heat exchanger cooling rapidly the syngas, a desulfurizer/getter bed, and the Brayton turbine for providing electric power and superheated steam for the duplex kiln and fuel cell for generating additional power. The syngas is then fed to both a Fischer-Tropsch (FT) reactor and Shift/Pressure Swing Adsorption System renewable H2 fuel as well as an option.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety. These element numbers refer to FIGS. 1A, 1B, 8A, 8B, and 8C.

| | |
|---|---|
| 1 | duplex kiln |
| 4 | kiln tube wall, feedstock |
| 6 | waste stream |
| 8 | exit tube |
| 10 | rotary plates, bellows |
| 12 | pipe, gases |
| 14 | pipe, tube |
| 16 | gas stream |
| 18 | chute |
| 20 | gear |
| 22 | arrow |
| 24 | waste |
| 26 | helical spiral flights |
| 30 | gas flowing, syngas |
| 32 | arrow |
| 34 | vanes |
| 36 | swirl region |
| 38 | flat wall region |
| 40 | media filter |
| 42 | tumbling media |
| 44 | port |
| 48 | reactor |
| 50 | reformer |
| 52 | cap |
| 52A | rotating sealing plates |
| 52b | rotating sealing plates |
| 54 | chute |
| 56 | hollow truss |
| 58 | structure |
| 60 | port, steam |

| | | |
|---|---|---|
| 80 | offgasses | |
| 82 | electrical power | |
| 83 | generator | |
| 85 | heat engine | |
| 88 | power | |
| 92 | fuel cell | |
| 93 | stream | |
| 94 | syngas | |
| 95 | off-gasses | |
| 98 | reactor | |
| 100 | unit | |
| 102 | off-spec streams | |
| 103 | fuel | |
| 104 | fuel | |
| 106 | hydrogen fuel | |
| 108 | gas | |
| 110 | flowpath | |
| 112 | hot syngas | |
| 114 | heat exchanger | |
| 116 | waste heat | |
| 117 | clean-up beds | |
| 118 | finished syngas | |
| 120 | clean syngas | |
| 122 | off-gasses | |
| 124 | hydrogen fuel | |
| 126 | PSA, process step | |
| 128 | steam stream | |
| 130 | steam | |
| 132 | shift converter, process step | |

Element Nomenclature

Process Diagram And Mass Balance Block Diagram

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety. This numbering system and nomenclature refers to FIGS. 2, 3, 4, 5, 6A, 6B, 6C, and 7. It is further understood that on those same figures the use of non-alphanumeric (i.e., the use of numbers without a letter prefix) refer to product streams being passed from one component to another.

| | | inputs | outputs |
|---|---|---|---|
| C-11 | Compressor | 1 atmos | 360 psig |
| C-13 | Compressor | 360 psig | 400 psig |
| D-23 | Stream Divider | FT gas/liquid bottom | Recycle gas |
| E-32 | Steam Turbine-Generator | Steam, 260F, 660 psig | Steam, 240F, 20 psig |
| F-24 | Flash tank/separator | Gas/liquid mix | Separate gas and liquids |
| F-9 | Flash tank/separator | Gas/liquid mix | Separate gas and liquids |
| F-12 | Flash tank/separator | Gas/liquid mix | Separate gas and liquids |
| H-2 | Heating Side of Heat Exchanger | 88° F. | 980° F. |
| H-20 | Heating Side of Heat Exchanger | 375° F. | 650° F. |
| H-6 | Heating Side of Heat Exchanger | 930° F. | 1850° F. |
| M-1 | Mixer | Recycle, steam, biomass | Recycle, steam, biomass |
| M-21 | Mixer | syngas and parafins | syngas and parafins |
| M-27 | Mixer | All water | All water |
| M-31 | Mixer | CO2 and light ends | CO2 and light ends |
| M-33 | Mixer | n/a | n/a |
| M-34 | Mixer | n/a | n/a |
| M-5 | Mixer | Steam, syngas | Steam, syngas |
| M-60 | Mixer | n/a | n/a |
| P-25 | Pump | water | |
| P-35 | Pump | n/a | |
| R-19 | FT Reactor | Finished syngas | Liquid hydrocarbons |
| R-3 | Equilibrium Reactor | biomass | syngas |
| R-20 | Hydrocracking Reactor | Heavy hydrocarbon | Light hydrocarbons |
| R-21 | Hydrotreating Reactor | Heavy hydrocarbon | Light hydrocarbons |
| R-7 | Equilibrium Reactor | Crude syngas | Finished syngas |
| S-10 | Component Splitter | Syngas & impurities | impurities |
| S-12 | Component Splitter | Wet syngas | Water and dry syngas |
| S-22 | Component Splitter | Light paraffins | wax |
| S-26 | Component Splitter | Gas and liquid paraffins | Separate gas/liquid paraffin |
| S-30 | Component Splitter | Liquid paraffins | Diesel product |
| S-31 | Component Splitter | Liquid paraffins | Water condensate |
| S-4 | Component Splitter | Syngas & solids | solids |
| T-17 | Distillation Tower | Mixed paraffins | Separated lights and heavy |
| T-37 | Tank | Paraffin product | |
| V-18 | Valve | Paraffin pressure control | |
| X-14 | Gas-to-gas Heat Exchanger | Hot syngas | Cool syngas |
| X-15 | Air Cooler Heat Exchanger | Hot syngas | Cool syngas |
| X-16 | Gas-to-gas Heat Exchanger | Hot paraffins | Cool paraffins |
| X-28 | Gas-to-gas Heat Exchanger | Hot paraffins | Cool paraffins |

-continued

|  |  | inputs | outputs |
|---|---|---|---|
| X-29 | Gas-to-gas Heat Exchanger | Hot paraffins | Cool paraffins |
| X-8 | Gas-to-gas Heat Exchanger | Hot syngas | Cool syngas |
| X-2 | Gas-to-gas Heat Exchanger | Hot syngas | Cool syngas |
| X-6 | Gas-to-gas Heat Exchanger | Hot syngas | Cool syngas |
| X-40 | Gas-to-gas Heat Exchanger | Cool paraffins | Hot paraffins |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "preferably," refers to features and aspects that are present in at least one embodiment, but which are optional for some embodiments.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What will be shown and described herein, along with various embodiments of the present invention, is discussion of one or more tests or simulations that were performed. It is understood that such examples are by way of example only, and are not to be construed as being limitations on any embodiment of the present invention. Further, it is understood that embodiments of the present invention are not necessarily limited to or described by the mathematical analysis presented herein.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

This document may use different words to describe the same element number. It is understood that such multiple usage is not intended to provide a redefinition of any language herein. It is understood that such words demonstrate that the particular feature can be considered in various linguistical ways, such ways not necessarily being additive or exclusive.

What will be shown and described herein are one or more functional relationships among variables. Specific nomenclature for the variables may be provided, although some relationships may include variables that will be recognized by persons of ordinary skill in the art for their meaning. For example, "t" could be representative of temperature or time, as would be readily apparent by their usage. However, it is further recognized that such functional relationships can be expressed in a variety of equivalents using standard techniques of mathematical analysis (for instance, the relationship F=ma is equivalent to the relationship F/a=m). Further, in those embodiments in which functional relationships are implemented in an algorithm or computer software, it is understood that an algorithm-implemented variable can correspond to a variable shown herein, with this correspondence including a scaling factor, control system gain, noise filter, or the like.

This application incorporates by reference U.S. patent application Ser. No. 12/287,996, PROCESS AND SYSTEM FOR CONVERTING WASTE TO ENERGY WITHOUT BURNING filed Oct. 14, 2008, now issued as U.S. Pat. No. 8,858,900, to the extent that US900 does not contradict information presented herein.

One embodiment relates to a process and system for an improved rotary steam/$CO_2$ reformer in which a solid organic waste stream is first converted to a syngas. In some embodiments that syngas is combined with a second stage that exothermically produces renewable hydrogen for fuel cell electric power and/or a unsaturated fuel such as Fischer-Tropsch diesel No. 2, JP-8 or Jet-A, with a small ~15% fraction as a high carbon-content, carbon-sequestering product. In some embodiments the overall process can be made energy positive without having to burn the waste or the syngas and consume oxygen and have large carbon dioxide emissions.

One aspect of some embodiments of the present invention is to cover methods and process systems to convert waste to energy without burning the waste, but to also sequester the carbon of the waste so carbon gases are not released.

The composition of the syngas was determined in a recently completed gas test according to one embodiment of the present invention using the Bear Creek Pilot plant where municipal solid waste was steam/$CO_2$ reformed to make syngas. The syngas composition is shown in Table 1 below.

TABLE 1

Results from Pilot Plant Gas Test By Steam/$CO_2$ Reforming Of Solid Waste

| | | |
|---|---|---|
| $H_2$ | Hydrogen | 62.71 vol % |
| CO | Carbon Monoxide | 18.57 |
| $CO_2$ | Carbon Dioxide | 10.67 |
| $CH_4$ | Methane | 7.58 |
| $C_2H_6$ | Ethane | 0.48 |
| $C_3$ TO $C_6$ | Propane through hexane | <0.01 |
| $C_6H_6$ | Benzene | <17 ppm |
| COS | Carbonyl Sulfide | 4 ppm |
| $CS_2$ | Carbon Disulfide | 0.05 ppm |
| $H_2S$ | Hydrogen Sulfide | <5 ppm |
| $C_{10}H_8$ | Naphthalene | 2.6 ppb |
| $C_{10}H_7CH_3$ | 2-Methylnaphthalene | ~0.6 ppb |
| $C_{12}H_8$ | Acenaphthalene | ~0.4 ppb |
| $C_{12}H_8O$ | Dibenzofuran | 0.36 ppb |
| PCDF + PCDD | Polychlorinated-dibenzofurans + Dioxins | 0.0041 ppt TEQ |

What has been found experimentally was that the syngas was rich in hydrogen and carbon monoxide and also pure. For fuel cells some of the poisons, such as carbonyl sulfide, hydrogen sulfide, carbon disulfide, hydrogen chloride, and polychlorinated organics, were identified. For Fischer-Tropsch, methanol synthesis, methanation, etc., this syngas is likely acceptable.

Another aspect of power recovery in some embodiments is to reduce the energy losses of the waste-reforming kiln. Some inventive processes involve a kiln, followed by a desulfurizer and a high temperature filter. The kiln can be operated at a high temperature, followed by an even higher temperature steam/$CO_2$ reformer which is then followed by the desulfurizer and high temperature filter.

Regarding Fischer-Tropsch, the challenge was to develop a process train where the Fischer-Tropsch unit could produce enough high carbon product, such as in one example high density, unsaturated paraffin wax containing little hydrogen, so that the carbon in the waste feed would be sequestered in this product, without carbon emissions leaving the process anywhere else. The Fischer-Tropsch train in some embodiments also produces steam for a steam-turbo-generator to make electricity for a process plant.

Figure 1B:
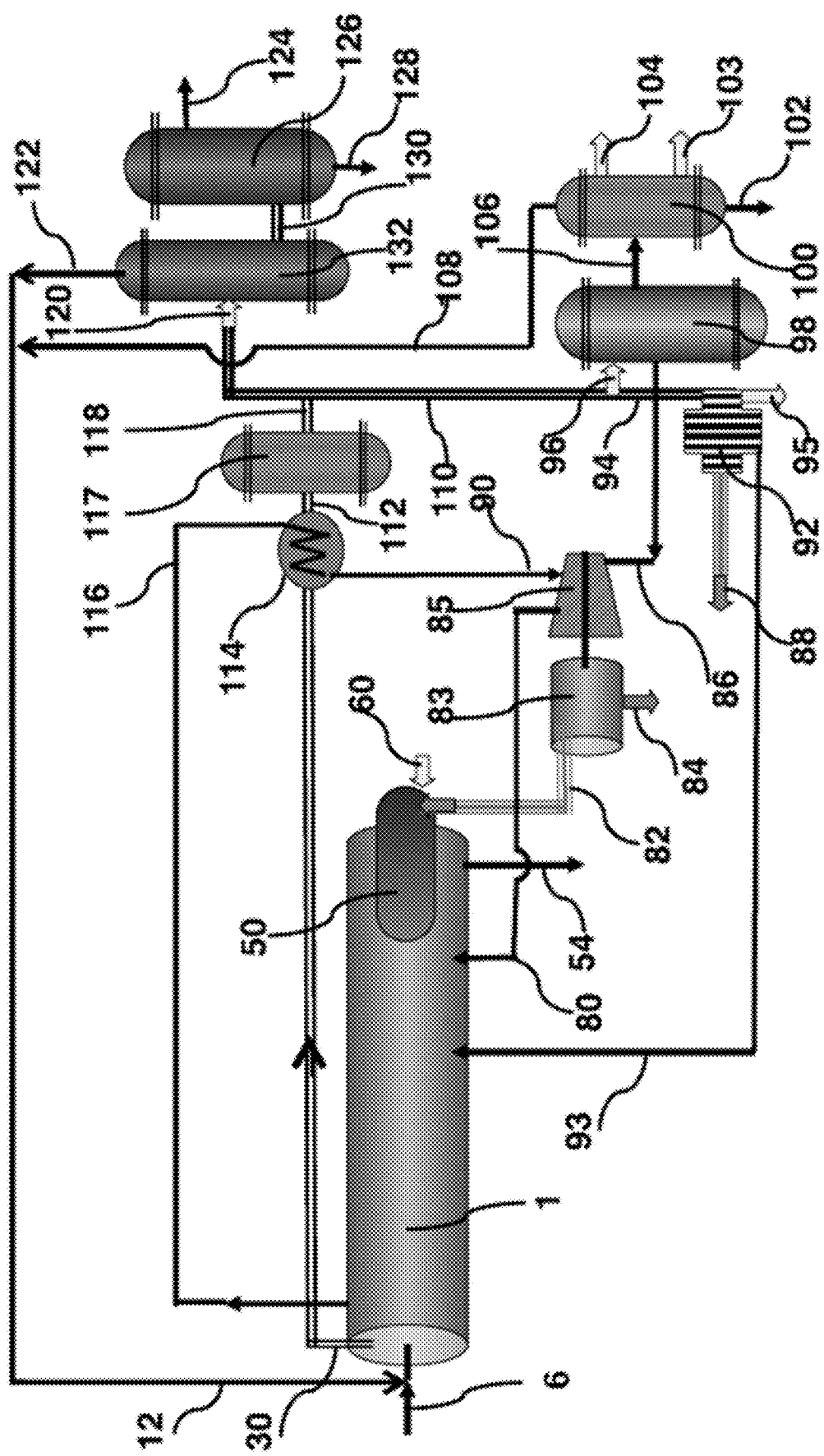
FIG. 1B shows the diagram of FIG. 1A with element numbers.

Now referring to FIGS. 1A, 1B, 8A, 8B, and 8C, the functionality of one embodiment of FIG. 1 is combined into a single kiln to increase the thermal efficiency and reduce the cost. This design is referred to as the Duplex Kiln 1, that combines the functions of the conventional kiln, steam/$CO_2$ reformer, swirl fines drop out, the high temperature filter, recover of high temperature radial heat loss, heating internal heating of helical spiral flights at the wall into a single unit.

Referring to the duplex kiln 1 in FIG. 8A, the waste stream 6 is fed oxygen-free through the large entry pipe 14 combined with recycle light gases through pipe 12. Also in FIG. 1A are the bellow sealing disk pair 52A, 52B that seals while at the same time allowing for the syngas to be used to heat the helical spiral flights This entry region remains stationary whereas the kiln tube wall 4, rotates as shown by arrow 22 and is sealed by means of a pair of bellows tensioned rotary plates, 10 where in the bellows applies pressure to the pair of rotating sealing plates, 52A at the left (from section A-A) and 52B at the right (from section B-B) The tube 4 rotates powered by drive pinion gear 20. Note that the bellows 10 is at the cold end of the duplex reformer where this bellows will have longer life. The thermal expansion is about 5" typically and the bellows can accommodate this movement, as well as the wide pinion drive gears. At the hot end of the Duplex reformer the drive pinion 20 is in a V-shaped gear arrangement to handle the end thrust from thermal expansion. Now as the waste enters tube 14, the gaseous portion moves above the waste into the kiln as gas stream 16. Once inside the kiln rotating tube 4, the solids are dropped into the bottom of kiln by chute 18. The waste solids 6 drop by this chute 18 onto the moving helical spiral flights 26 moving from left to right and carrying with them the waste 24. These helical spiral flights 26 are hollow with the gas 30 flowing in their interior from right to left, counter-current to the waste and leaving through gas exit tube 8. It can be seen that the hot gas 30 is received within the interior of the hollow spiral flights 26, thus heating these flights by convection. The hot gas 30 is substantially cooler as it leaves the hollow flights through exit 8. It can be seen that the hot gas 30 and the waste material 6 move in opposite directions within kiln 1.

As the waste 24 is moved progressively to the right by the helical spiral flights 26, it eventually enters a flat wall region 38 where there is a tumbling media 42 that helps break lumps of waste and helps form an aggregate material that leaves the rotary kiln through chute 54.

The gases 16 enter the swirl region 36 where their flow trajectory is driven into a curved flow by vanes 34A and 34B. In this region 36 the curved flow trajectory velocity throws the particles downward as shown by arrow 32, so as to join with the other solids moving along flat wall region 38 toward exit chute 54. It can be seen that a second set of vanes 34B (as best seen in FIG. 8C) redirect gas 16 toward filter 40. These gases 16 with less fines pass through porous media filter 40 and enter the electrical heated reactor 48 that has interior disk and donut baffles 46 which steer the flow to pass cross flow around the cylindrical heating elements 50 for improved convective heat transfer.

This reactor 48 does not rotate as it is fixed to the stationary region of the kiln by fixation cylindrical structure 58 that is attached to the cylindrical, insulated cap 52B. As best seen in FIGS. 8A and 8C, cap 52B includes a plurality of through holes. The hole pattern allows the finished syngas 30 to enter the helical spiral flights 26 and eventually leave this duplex kiln at exit pipe 8. Kiln 1 thus includes a heat transfer path in which the hot syngas flows in a direction opposite to the general direction of the flow of the waste material 24. The electrically heated reactor 48 is further supported mechanically by hollow truss 56 through which superheated steam and optionally added $CO_2$ is fed by port 60 and enters this reactor through port 44. This added reactant gases help further drive the formation of the finished syngas with improved conversion to thermodynamically equilibrium with an internal residence time at temperature of around one-half to three seconds.

In FIGS. 1A and 1B the duplex rotary steam/$CO_2$ reformer 1 is shown as it is placed into one embodiment of the waste-to-fuel and energy processing system. Some embodiments of the rotary reformer have an integral steam reformer 50 at the exit end which reduces expensive high temperature piping and the heat losses associated with such piping. The biomass/waste feedstock 4 enters the process around room temperature at the left and exits the process at chute 54 on the right. The finished syngas 30 that is produced exits at the left at somewhat above room temperature, and is generally formed at the right in reactor 50. The solid biomass/waste enters at the left and is mixed together with warm light end gases 12 from the downstream process units, such as gas 108 from Fischer-Tropsch and/or Pressure Swing Adsorpber (PSA) off-gases 122 from the hydrogen purification section shown as process steps 126 and 132.

Now referring to the exit end to the right of the duplex rotary steam/$CO_2$ reformer 1, the electrically heated, hot gas-phase main steam/$CO_2$ reformer 50 is inserted though the right side. Any inorganics and solid carbon phases exit the duplex rotary reformer warm but not hot through exit pipe 54 that is configured to minimize entry of outside air. Besides the electrical heating, there are three other means of heating and supplying the endothermic heat needed to drive the steam/$CO_2$ reforming chemistry: [1] warm recycled light end gases 12 as well as [2] hot power generation hot gases 80 from Brayton cycle heat engine and [3] hot power generation hot gases 93 from hot cathode nitrogen-rich off-gases. This hot gas heat enters the reformer 1 into the typical oven that surrounds commercial kiln retort tubes that rotate. These gases preferably do not enter with the recycled gases 12 that enter the process flow, since gases 12 should be oxygen-free. Hot fuel cell anode off-gases 95 containing unreacted H2 and CO plus $CO_2$ and light hydrocarbons may be mixed into port 60 to enter the electrically heated steam/$CO_2$ reformer.

Referring to FIG. 1B, the finished syngas 30 from the duplex rotary reformer 1 is next heated by heat exchanger 114 using waste heat 116 from the duplex reformer 1, so that the hot syngas 112 enters the absorber clean-up beds 117 for sulfur, mercury, chlorine, etc. removal. The cleaned, finished syngas 118 is now substantially ready for use in product production of fuels, hydrogen gas, and power. This clean syngas 120 first enters the Shift Converter 132, then enriched with H2 in steam 130 enters the PSA 126 for concentrating the hydrogen. Off-gases 122 from the Shift Converter are recycled back 12 to the front end of the duplex reformer. The PSA in some embodiments produces hydrogen fuel, 124. There is also a steam stream 128 that can be used in stream 60 to assist the electrically-heated reformer 50.

Additionally in FIG. 1B, this syngas 118 can be sent via flowpath 110 down to the Fischer-Tropsch (FT) where it enters via 96 into the FT reactor 98 that produces the crude paraffinic hydrocarbon fuel 106. This FT reactor 98 is exothermic and produces high pressure steam that can be used in the Brayton cycle turbine/engine 85 to make electrical power 82 via generator 83. Although what has been shown and described is the use of a Brayton cycle heat engine, it is further understood that any type of heat engine, including, as an example, a Stirling cycle engine, is contemplated. The hot turbine off gases 80 exiting engine 85 can be used to heat the duplex reformer. The crude FT paraffinic fuel 106 is separated and distilled in unit 100 into a naphthenic fuel like, Jet JP4 and into FT Diesel No. 2 103, both of which can be sold. The off-spec streams 102 consisting mostly of wax and alcohols and steam can be used to create steam that can be supplied in stream 60 in FIG. 1B for further reforming in the electrically heated steam/$CO_2$ reformer 50 to make more syngas and eventually more product. Various embodiments of the present invention operate with a high carbon efficiency and high energy utilization and efficiency.

In FIG. 1B, the clean syngas remaining 94 enters a solid oxide fuel cell 92 that converts electrochemically this syngas into electricity and power 88 to drive the plant and also start up the plant when the fuel cell is run on natural gas or tank propane or diesel. This fuel cell 92 anodically reacts some 85% of the syngas and the 15% left over gas consisting of unreacted $H_2$ and CO plus $CO_2$ can also be used to create steam for use in stream 60. The cathode off-gas includes hot nitrogen and this can be used to further heat the duplex reformer via stream 93.

Figure 8B:
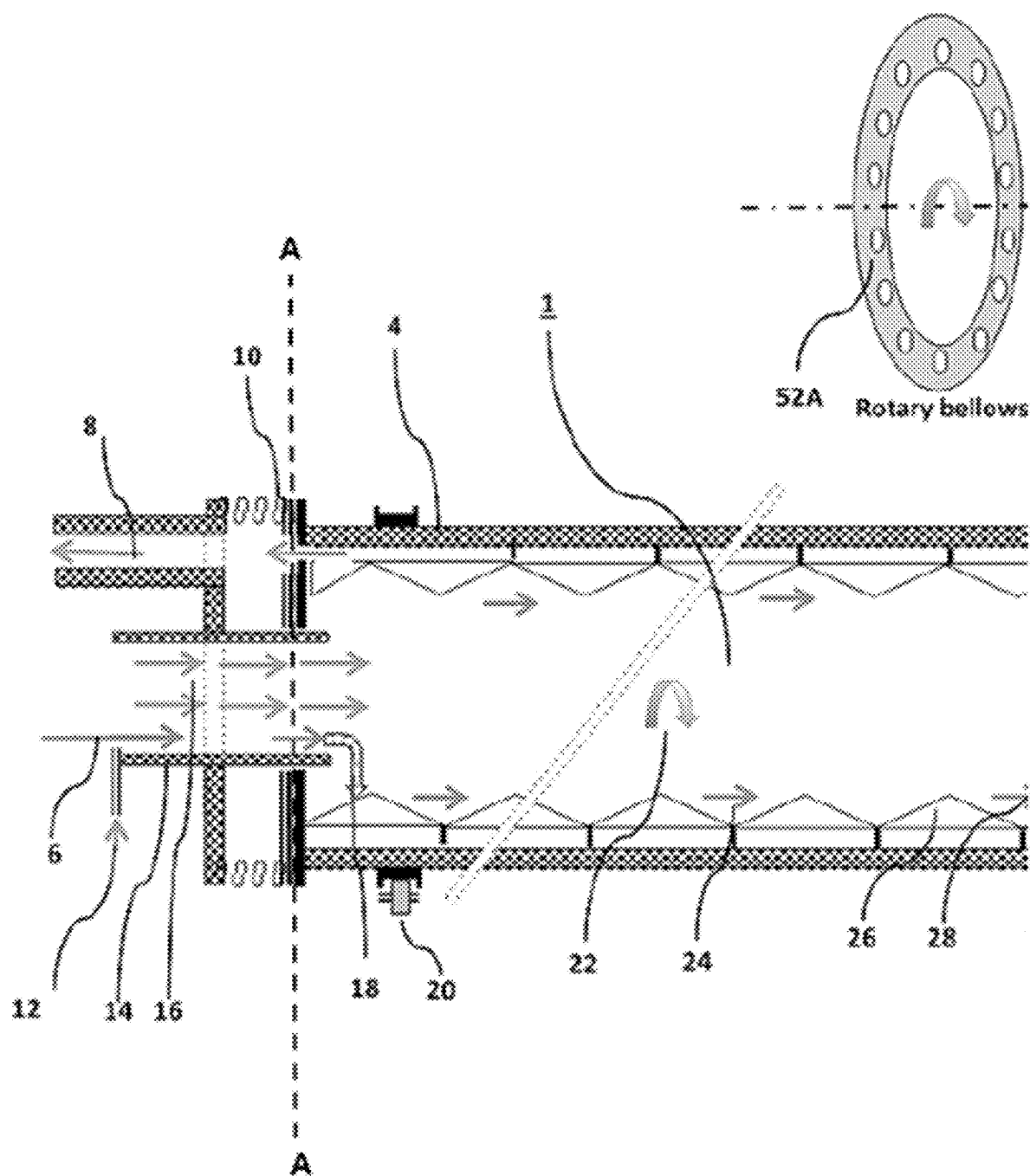
Figure 8C:
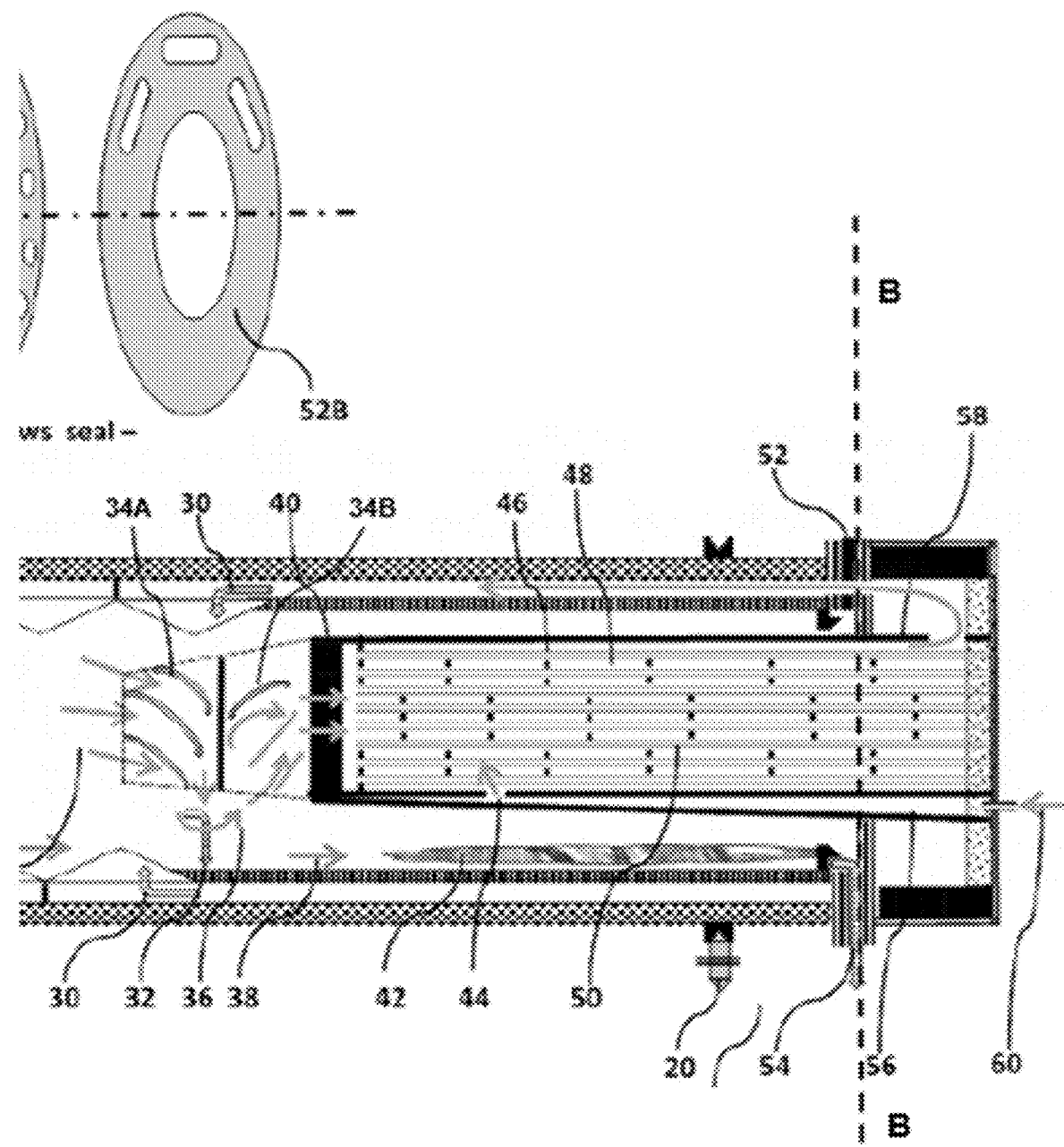

Referring to FIGS. 8A, 8B, and 8C, the thermal efficiency in some embodiments derives from inside of the rotary reformer (calciner equipment) with the inserted spiral flights that are hollow and allow the hot syngas to be counter-flowed from the right back out the entry through the rotary plate seal. This provides the heat for the solids feed and cools the syngas as well. In the center is a cyclonic swirl vane section 36 that helps drop out fine solids entrained in the gas. The fines drop into the inorganic solids left after initial steam reforming around 900-1100° F. The cleaned syngas passes through a mesh filter 40 and enter the high temperature main steam/$CO_2$ reformer that is electrical heated. The hot syngas at 1800-2000° F. that exits is rich in hydrogen, as shown in Table 1. This hot finished syngas is then passed through the spiral flights 26 in counterflow direction to exit cooled at the port 8 of the rotary reformer. This is generally about 15 wt % of the feedstock entering the process. High carbon efficiency is achieved via the bottom exit. There is also the option of a rebar section that tumbles to break up any larger pieces of solids into an aggregate size the material that can be used as a 70-80% carbon rich, 0-10-10 slow release pellet fertilizer, thus sequestering this carbon in the ground and not resulting the release of GHG to the Earth's atmosphere.

EXAMPLES

Figure 2:
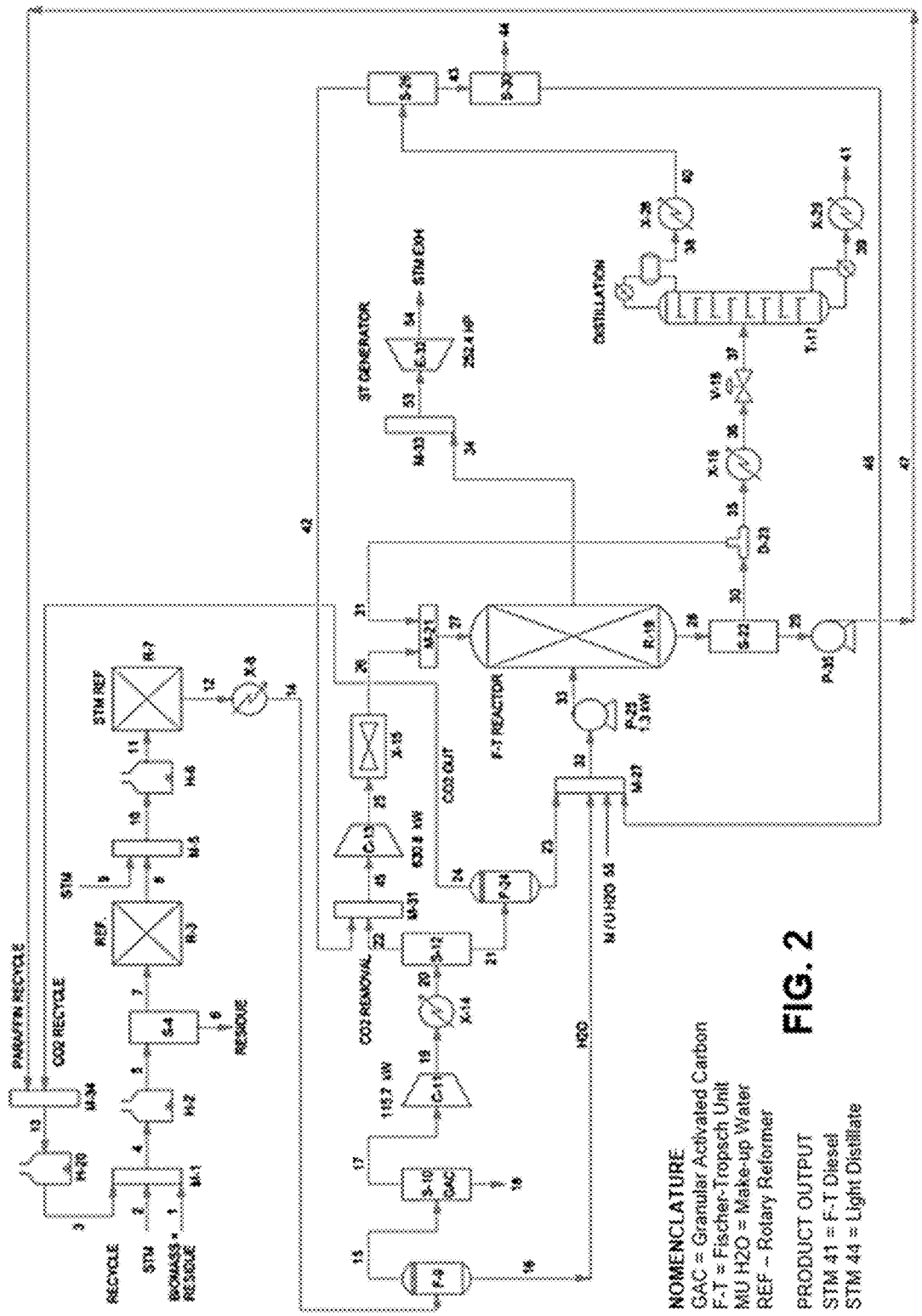
In FIG. 2 there is shown a process diagram that uses high moisture content sewage biosolids or biomass from agriculture or animal feedlots, according to one embodiment of the present invention.
Figure 3:
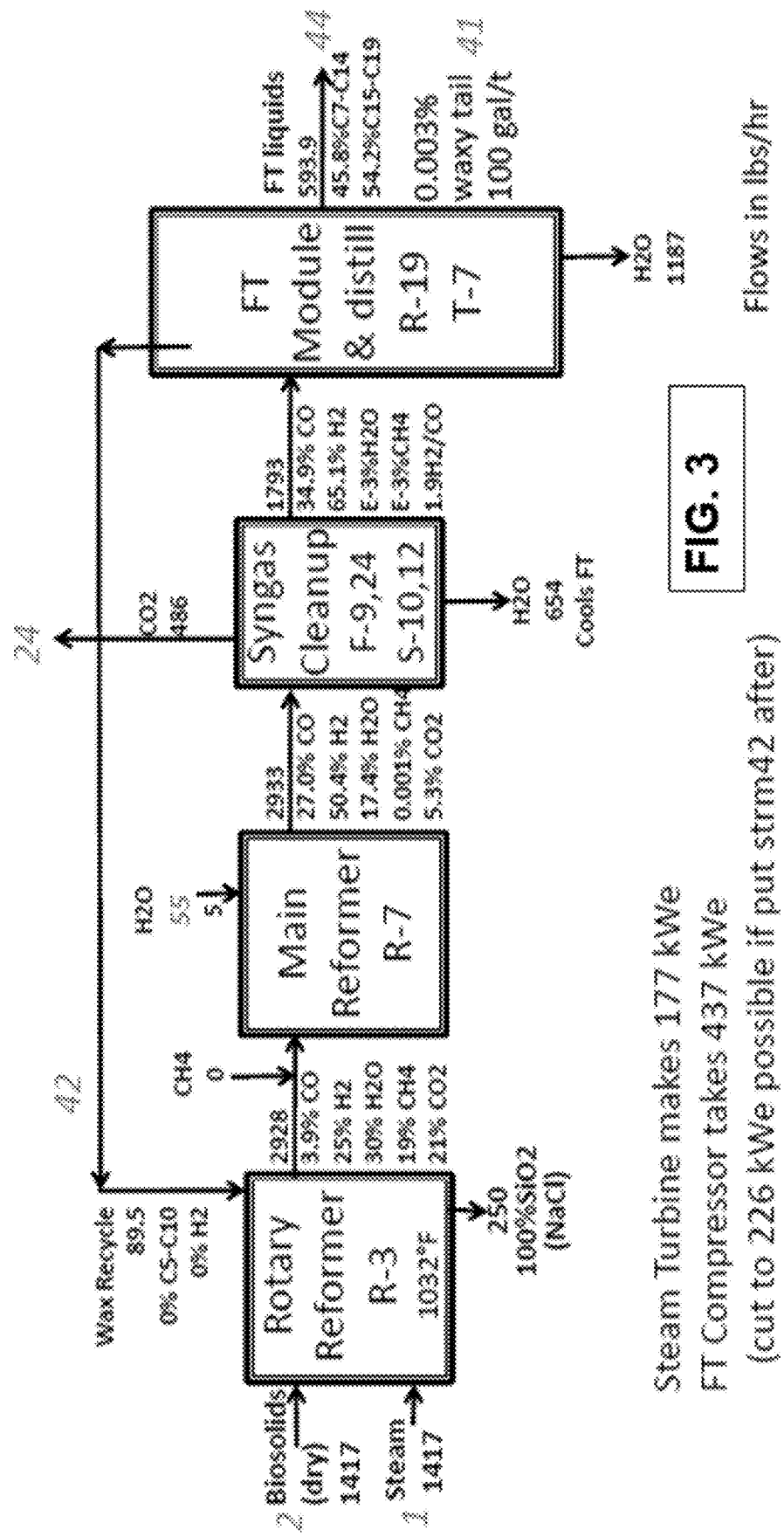
In FIG. 3 is shown a mass balance block diagram for the process diagram of FIG. 2, which shows how the FT process that makes liquid fuel and paraffin wax product for carbon sequestration accomplishes recycling to the process front end of $CO_2$ and the light hydrocarbons that can include methane, ethane, ethylene, propane, etc. to avoid their emissions as greenhouse gases (i.e. methane), and also recycling the lighter hydrocarbons to help maintain a higher $H_2$/CO ratio of the syngas needed for FT. It also describes how a waste stream can be made to release energy without having to burn the waste or the syngas. At the same time the waste can be converted into use carbon-containing fertilizer, hydrogen fuel, and a carbon-sequestering, high-carbon content product of commercial value, such as unsaturated, high-density paraffin wax.
Figure 4:
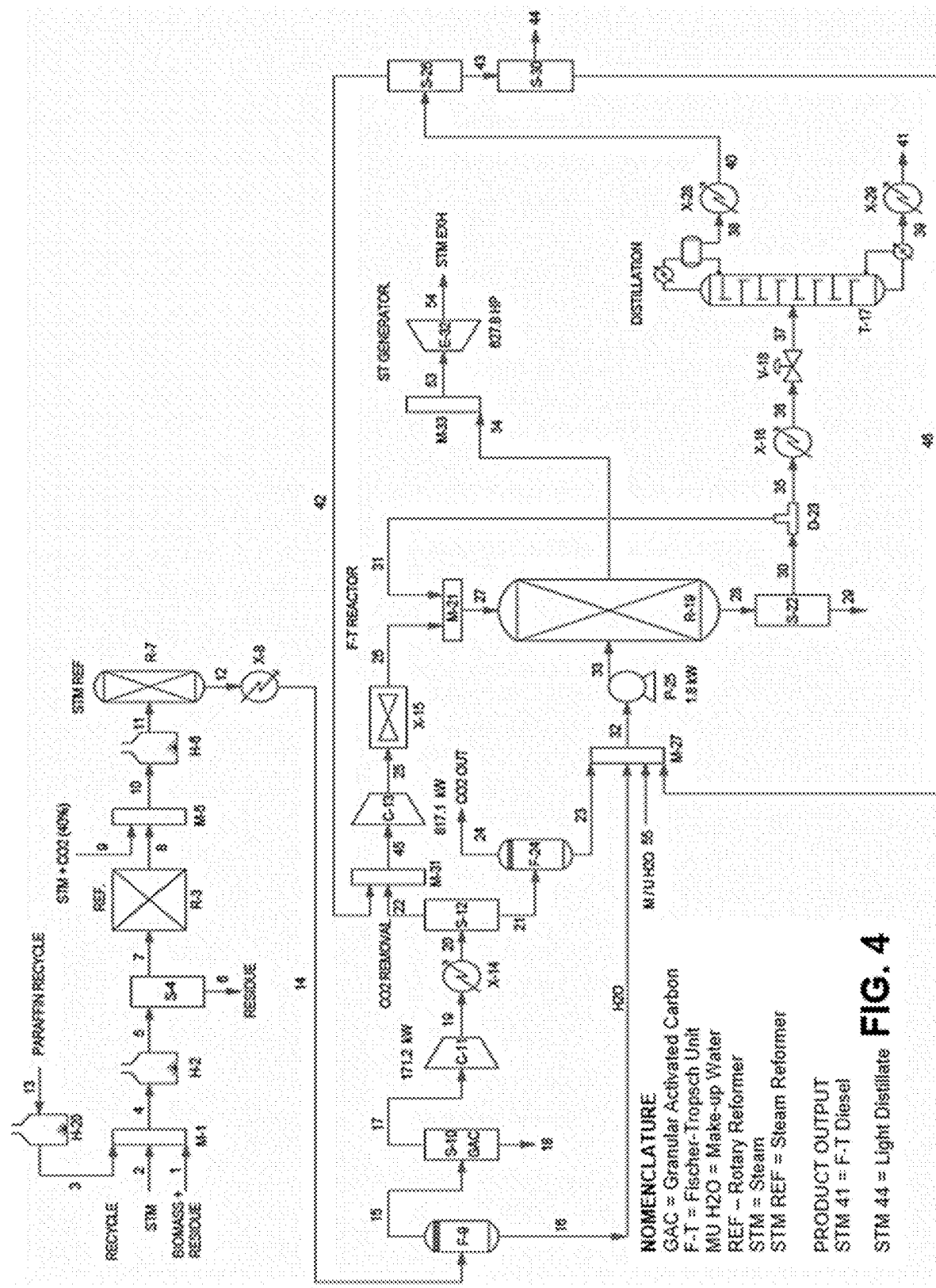
FIG. 4 is a process diagram and flow sheet showing a second example according to another embodiment of the present invention for recycling $CO_2$ into the main steam/$CO_2$ reformer, R-7.
Figure 5:
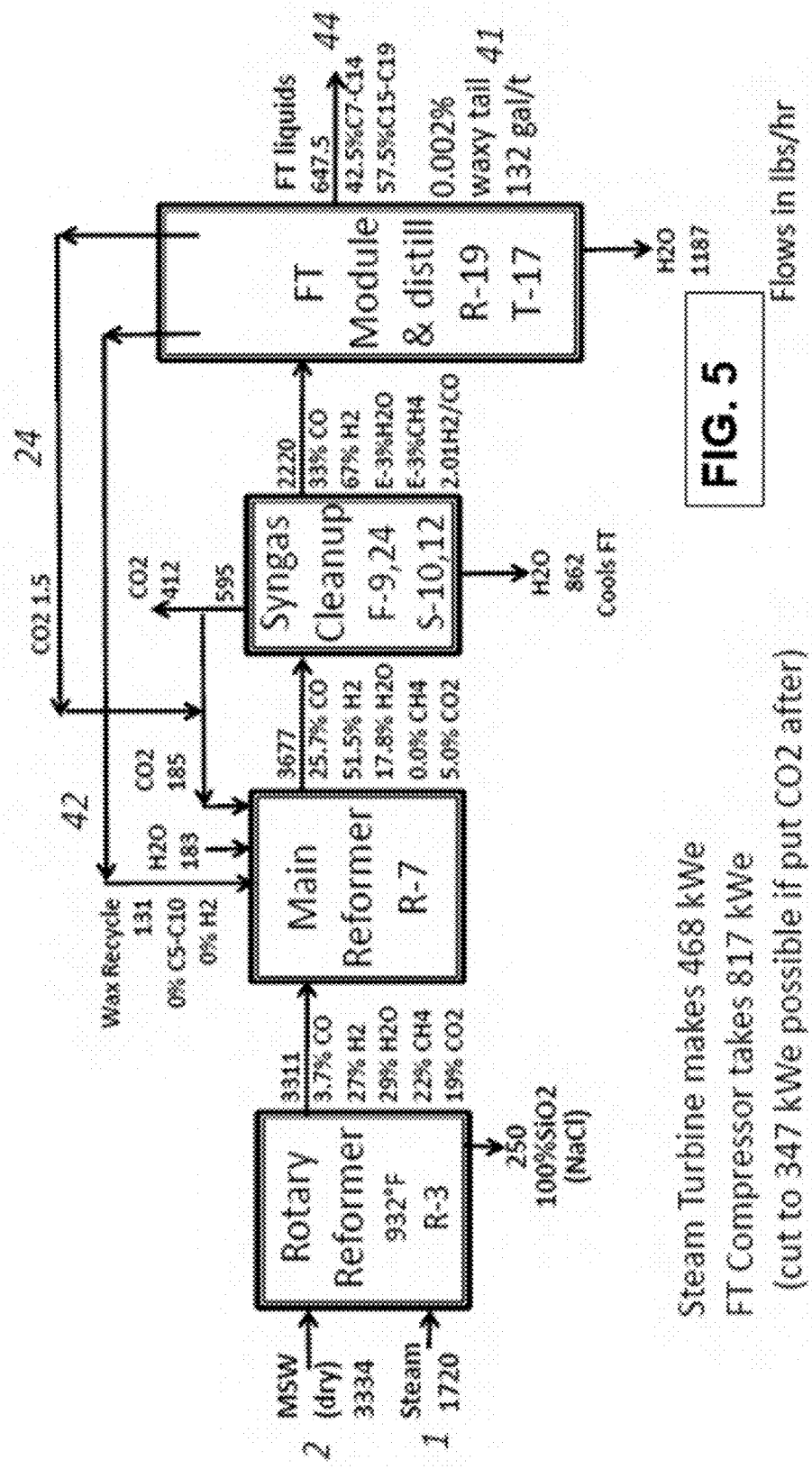
FIG. 5 is a block diagram showing the mass balance for the process diagram of FIG. 4.
Figure 6A:
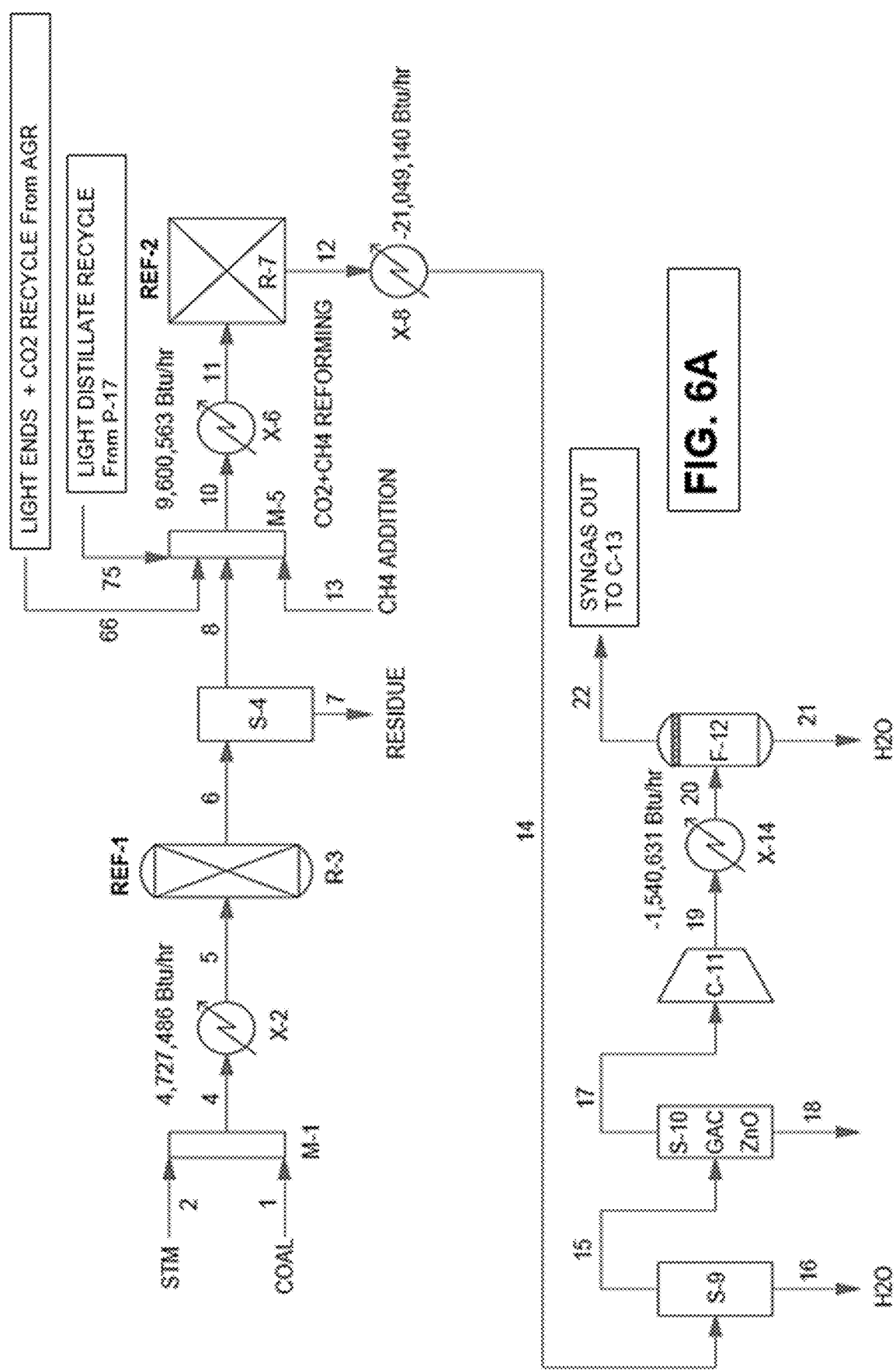
FIG. 6A is the front portion of a process diagram of a 25 ton per day process according to one embodiment of the present invention using coal and waste mine methane as the feedstocks.
Figure 6B:
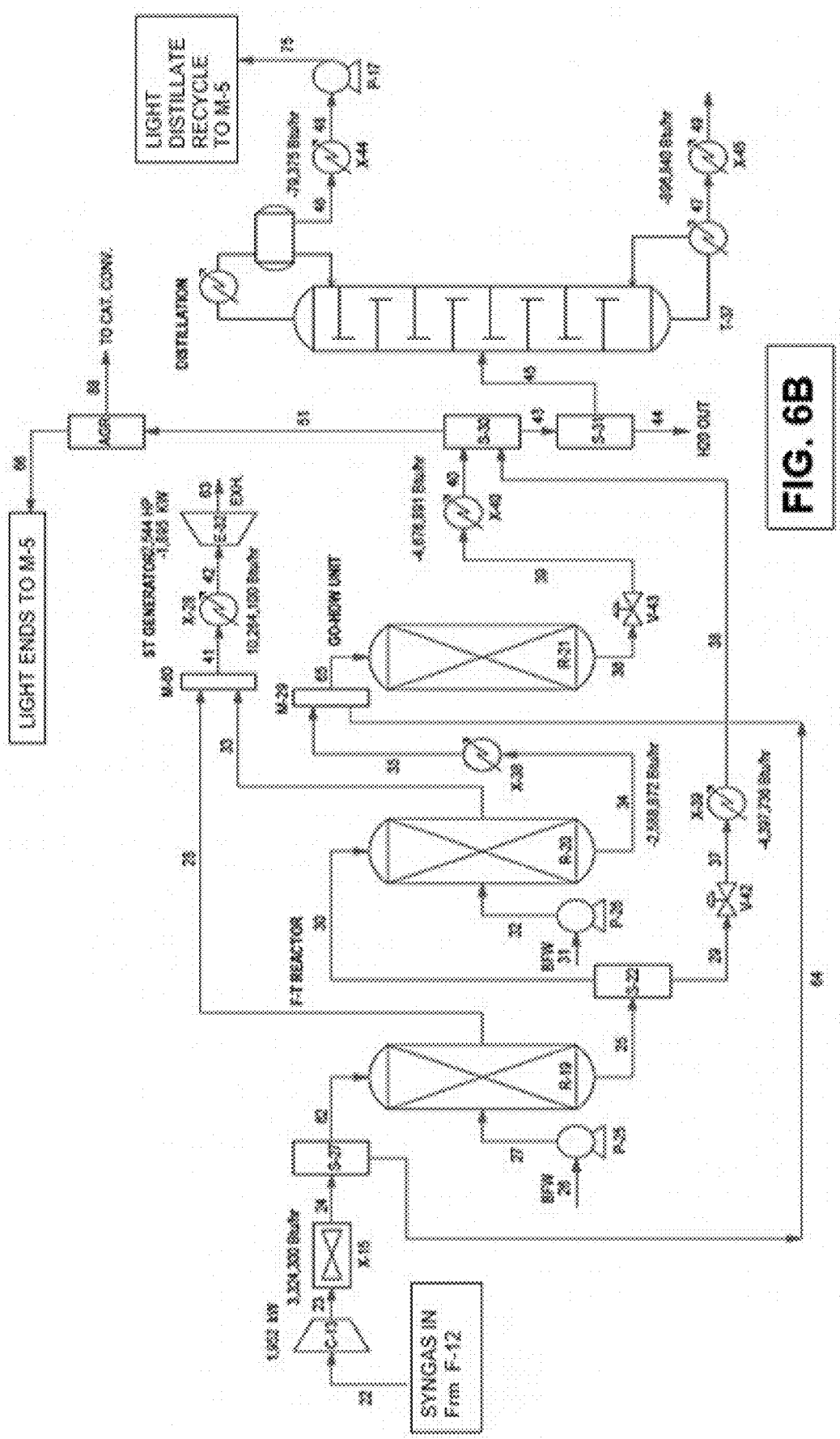
FIG. 6B is the FT portion of a process diagram of a 25 ton per day process of FIG. 6A according to one embodiment of the present invention.
Figure 6C:
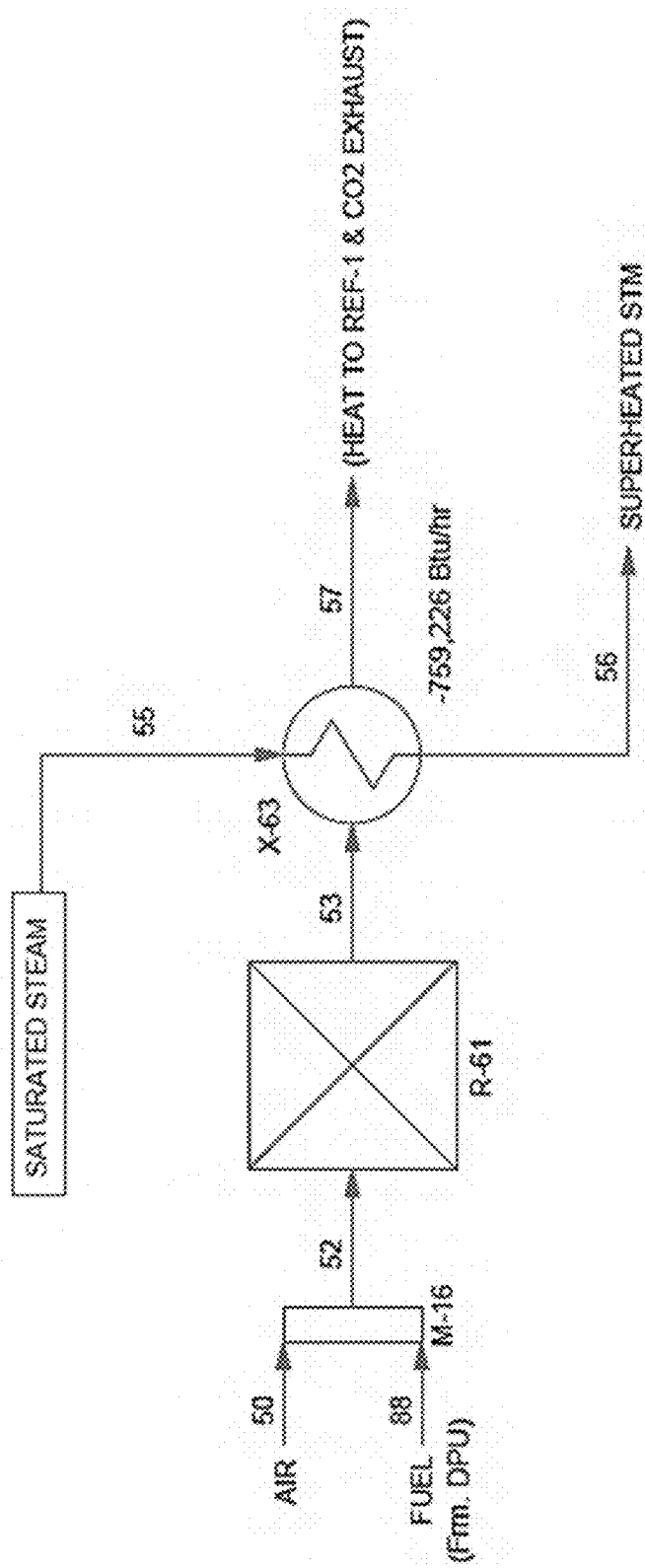
FIG. 6C is the steam superheater portion of a process diagram of a 25 ton per day process of FIG. 6A according to one embodiment of the present invention.

The first example of one implementation of the process of FIG. 2 is shown in the mass balance block diagram of FIG. 3, which uses high moisture content sewage biosolids or biomass waste steam from agriculture or animal feedlots. The size of this plant simulated was 20 dry tons/day, with all of the paraffin wax from the FT reactor and any bottoms of the distillation column being recycled back to be reformed again to make more syngas that can be used to increase the amount of diesel produced. All of the $CO_2$ is recovered and also recycled, essentially eliminating release to the atmosphere.

In this case, the MSW feed has a 50% moisture content as shown in FIG. 3 by the 1417 lbs/hr dry feed plus the 1417 lbs/hr of moisture shown as steam. The inorganics from the MSW are simulated using inorganic salt based on the Ash content of the MSW determined by Ultimate/Proximate analysis. The result is the 593.9 lbs/hr of total FT liquids product steam made up of 45.8% naphtha and 54.2% diesel. This produces 100 gal/dry ton of FT liquids, that is about 50% better than the competitive FT Biomass-to-fuel plants.

Still further embodiments of the present invention include other features identified while performing this study. One such feature includes that if the hydrocarbon stream 42 is recycled after the FT compressor, the energy demand for this compressor can by reduced to 226 kWe down from the 437 kWe. This identifies that the process is only slightly energy negative with the electricity produced from a steam turbine using the FT steam produced. Additional waste energy recovery in some embodiments yields a plant for biomass that is energy positive. The rest of mass balance is summarized in FIG. 3.

A system according to another embodiment of the present invention is shown in a second example feeding MSW containing higher value plastics using the computer process simulation of MSW with the rotary reformer and the high temperature main reformer, R-7, to produce by Fischer-Tropsch both a naphtha and a diesel fuel with all the other lighter and heavier hydrocarbons recycled back to the rotary reformer as well as any $CO_2$ produced back to the main reformer. The process diagram and flow sheet is shown as FIG. 4.

The size of this plant simulated was 20 dry tons/day, with all of the paraffin wax from the FT reactor and any bottoms of the distillation column recycled back to be reformed again to make more syngas that can be used to increase the amount of diesel produced. In addition the $CO_2$ offgas from the syngas cleanup steps and a little from the FT reactor are split with 30% being recycled to the main reformer in stream 9 to use this valuable carbon resource to further make more syngas and thus more diesel. The remaining $CO_2$ is vented. A mass balance is summarized in FIG. 5.

Note that the flows for this 20 dry ton/day case of MSW are in lbs/hr. The MSW feed has a 25% moisture content as shown by the 3334 lbs/hr dry feed plus the 1720 lbs/hr of moisture shown as steam. The inorganics from the MSW are simulated using inorganic salt based on the Ash content of the MSW determined by Ultimate/Proximate analysis. The result is the 647.5 lbs/hr of total FT liquids product steam made up of 42.5% naphtha and 57.5% diesel. This shows that it is possible to carry out the various recycles as discussed in the specification and various embodiments and produce a product that is a high 132 gal/dry ton.

A still further embodiment includes that if the $CO_2$ steam is recycled after the FT compressor, the energy demand for this compressor can by reduced to 347 kWe down from the 817 kWe. This indicates that a process according to one embodiment is nearly energy positive. The electricity can be produced from a steam turbine operating from the high temperature steam produced from the highly exothermal FT reactor.

Figure 7:
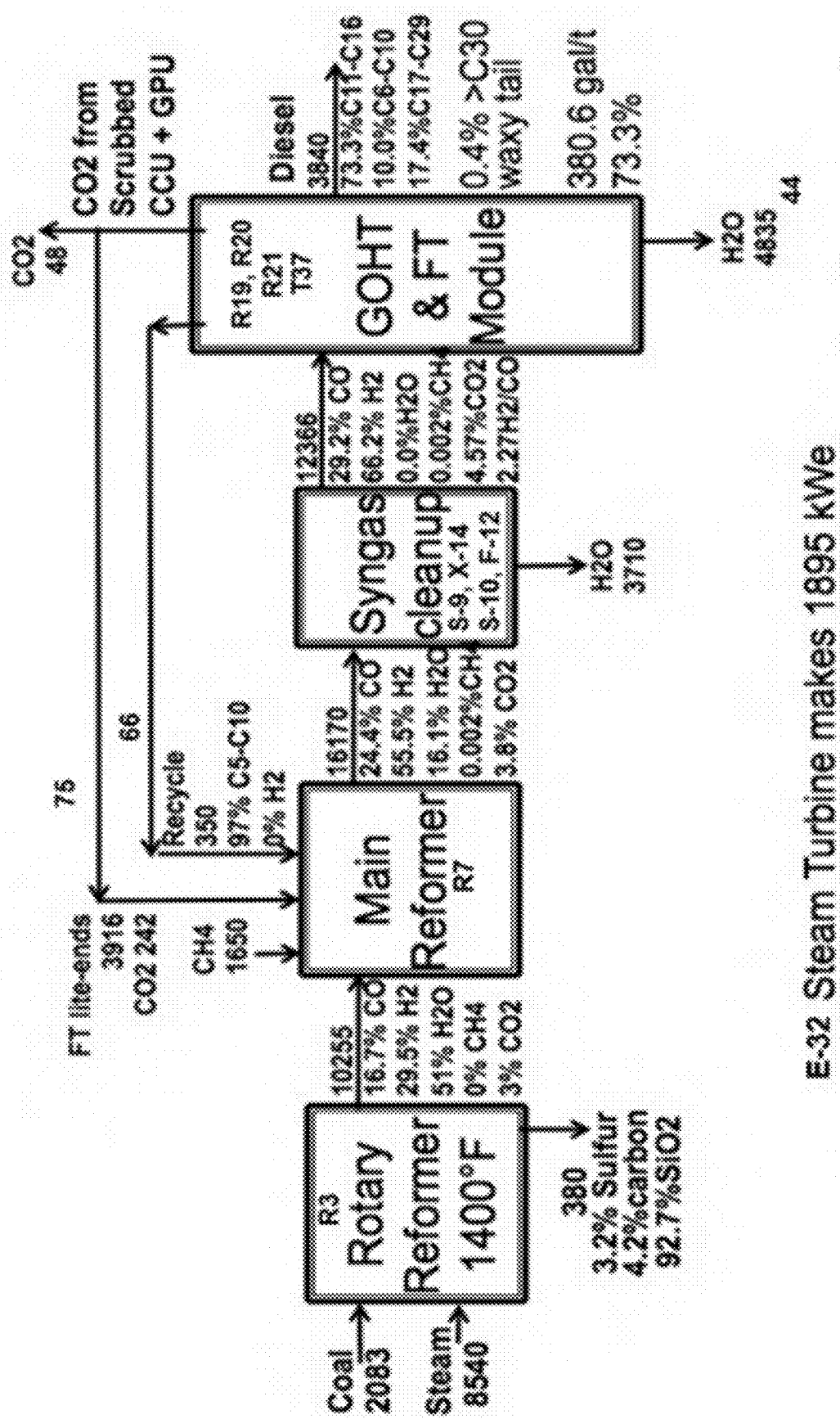
FIG. 7 is a mass balance block diagram showing mass balance for the process diagram of FIGS. 6 when the feedstock is coal and methane making the FT product with essentially zero $CO_2$ emission.

Yet a third example as shown in the process diagrams of FIGS. 6 involves the use of dirty coal mine with mine-mouth waste methane gases in stream 13 as well as $CO_2$. The mass balance block diagram is shown in FIG. 7.

The coal feedstock stream was 2083 lbs/hr on dry basis, coal-mouth methane at 1650 lbs/hr and the steam used 8540 lbs/hr, The coal ash containing minerals represented by $SiO_2$ was removed from the rotary reformer at 380 lbs/hr. Recycle streams used were FT light ends at 3916 lbs/hr and distillation tops at 350 lbs/hr. The water recovered from the syngas cleanup (3710 lbs/hr) as well as from the FT reactor (4835 lbs/hr) covered the water needs at the feed of 8540 lbs/hr. As the result of this nearly full utilization of the carbon (some of the exceptions being for a small $CO_2$ vent stream of $CO_2$ of 48 lbs/hr and small amounts of inerts such as argon and nitrogen) the quantity of FT liquids produced (73.3% diesel and 17.4% naphtha) was about 3840 lbs/hr. Based the coal solids stream this was 380.6 gallons/ton or based on the total gas plus solids feed from the dirty coal mine was 212 lbs/hr, which is about three times larger than the competitive coal-to-fuel processes. One aspect of this high carbon efficiency is the use of recycles of carbon-containing streams to minimize the $CO_2$ vent stream to the atmosphere. This $CO_2$ vent was so low that the plant came under the EPA trigger of less than 250 tons/yr.

The purpose of these three examples show the large improvements that are possible using the various recycle streams to produce more syngas, adjust the H2/CO ratio, improve greatly the carbon efficiency, and produce more FT fuels with a duplex rotary reformer that can accept these recycles all in a single, more cost-effective, higher thermal efficiency device.

Various other embodiments of the present invention pertain to the following:

An improved design of an indirectly-heated rotary calciner that will accept biomass and waste including organic material, carry out oxygen-free steam/$CO_2$ thermo-chemistry to make $H_2$-rich syngas (40-65 vol % $H_2$), and where the solids in the feedstock are heated from 20 to 700° C. as they are conveyed through the rotary kiln by helical spiral flights that are hollow and heated inside by counter-flowing hot gas from 700-1300° C. which assists in the vaporization, volatilization, and steam/$CO_2$ reforming of the waste, and where this syngas that is formed is partially cleaned of entrained particulates by a swirl vane arrangement to drop out fines as well as a filter plate to further collect and drop out finer entrained particulates, and where this syngas formed is further reacted in an electrically-heated steam/$CO_2$ reforming reactor to accomplish conversion to syngas, minimize the formation of carbon soot below 2%, methane below 7%, benzene below 6 ppm and dioxins and furans below 0.01 ppm.

and where this hot finished syngas is the source of helical spiral flight heating that provides the heat needed for the incoming biomass/waste feedstock, and where any inorganic contaminates, such as metals, glass, sand, and rock are broken and ground up to a finished aggregate ranging in size from 2 to 10 mm diameter to leave the duplex reformer.

Yet another embodiment of the present invention pertains to an improved design of an indirectly-heated rotary calciner that will accept biomass and waste consisting of any organic material, carry out oxygen-free steam/$CO_2$ thermo-chemistry to make $H_2$-rich syngas (40-65 vol % $H_2$), and which can accept and steam/$CO_2$ reform a variety of recycled gases from Fischer-Tropsch synthesis and separation process steps, and from fuel cell anodic and cathode off-gases, and can be used to also make thermal energy sufficient to drive the process as well as electrical power to run the plant.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. As one example, it is understood that still further inventive combinations are disclosed in combinations of any of the originally-filed independent claims as combined with one or more of any of the originally-filed dependent claims, such as claims originally dependent on one independent claim also being considered in combination with any of the other originally-filed independent claims.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An apparatus for calcination of organic material, comprising:
   a kiln including first and second stationary ends and a rotating midsection between the two ends, the first end including an entrance for organic material and a separate exit for syngas;
   a conveyor for moving organic material from the entrance toward the second end, said conveyor being supported within the midsection, said conveyor including an internal gas path that provides syngas to the exit; and
   a electrically heated steam reformer supported at the second end, said reformer including an inlet for receiving organic material and an outlet for providing heated syngas to the internal gas path, said reformer including a reactor receiving organic material from the inlet and providing heated syngas to the outlet;
   wherein said rotating midsection rotates axially around outside said reactor; and
   wherein the flow of syngas from the outlet of said reformer through the internal gas path to the exit transfers heat into said conveyor and said heated conveyor transfers heat into the moving organic material.

2. The apparatus of claim 1 which further comprises at least one turning vane proximate to the inlet of said reformer, said vane being adapted and configured to separate solid inorganic material from the organic material prior to being received in said reactor.

3. The apparatus of claim 1 which further comprises a grinding region located within the midsection that receives solid inorganic material, said grinding region including tumbling media to crush the solid inorganic material, the crushed material being provided to a chute supported at the second end of said kiln.

4. The apparatus of claim 1 wherein said conveyor is a helical conveyor rotatable with the midsection.

5. The apparatus of claim 4 wherein the internal gas path extends down the central hub of the helix shape.

6. The apparatus of claim 5 wherein the internal gas path extends within spiral arms of the helix shape.

7. The apparatus of claim 4 wherein the helical conveyor is affixed to an interior of the midsection.

8. The apparatus of claim 7 wherein the internal gas path is formed between the interior of the midsection and the helical conveyor.

9. The apparaus of claim 1 which further comprises a heat exchanger that receives the syngas flowing out of the exit of said kiln and reheats the syngas with waste heat from said kiln.

10. The apparatus of claim 9 which further comprises a shift converter that receives at least a portion of the reheated syngas from the heat exchanger for shift conversion of the some of the reheated syngas to hydrogen.

11. The apparatus of claim 9 which further comprises a pressure swing adsorber that receives at least a portion of the reheated syngas and separates a carbon dioxide portion of said reheated syngas.

12. The apparatus of claim 11, wherein the separated carbon dioxide portion is returned from the pressure swing absorber to the kiln.

13. An apparatus for calcination of organic material, comprising:
    a kiln including first and second stationary ends and an outer wall between the two ends, the first end including an entrance for organic material, said kiln including an exit for syngas at one of said stationary ends;
    a helical conveyor for moving organic material from the entrance toward the second end, said conveyor being affixed to an interior of the outer wall and being rotatable relative to the first end, said conveyor including an internal gas path in fluid communication with the exit; and
    a heated steam reformer supported within said kiln, said reformer including an inlet for receiving organic material and an outlet for providing heated syngas to the internal gas path, said reformer including a reactor receiving organic material from the inlet and providing heated syngas to the outlet;
    wherein the flow of syngas from the outlet of said reformer through the internal gas path to the exit transfers heat into said helical conveyor and said heated conveyor transfers heat into the moving organic material.

14. The apparatus of claim 13 which further comprises a heat exchanger that receives the syngas flowing out of the exit of said kiln and reheats the syngas with waste heat from said kiln.

15. The apparatus of claim 14 wherein at least a portion of the reheated syngas flows into a reactor for shift conversion of the some of the reheated syngas to hydrogen.

16. The apparatus of claim 14 wherein a carbon dioxide portion of syngas exiting the reactor is separated by a pressure swing adsorber.

17. The apparatus of claim 16, wherein the separated carbon dioxide portion is returned from the pressure swing absorber to the kiln.

18. The apparatus of claim 13 wherein at least a portion of the syngas flowing from the exit of said kiln is received in a Fischer-Tropsch reactor.

19. The apparatus of claim 18 which further comprises a heat engine driving an electric generator, wherein steam generated in said FT reactor is provided to power said heat engine.

20. The apparatus of claim 19 wherein said steam reformer is electrically heated, and electricity from said electric generator is provided to said steam reformer.

21. The apparatus of claim 13 wherein said steam reformer is supported by a hollow truss within said kiln, said hollow truss including an entrance for steam and being in fluid communication with said reactor.

* * * * *